United States Patent Office 2,830,962
Patented Apr. 15, 1958

2,830,962
PROCESS OF PREPARING WAX MODIFIED POLYSTYRENE COMPOSITIONS

Peter B. Potter, South Plainfield, and Frazier Groff, Plainfield, N. J., assignors to Union Carbide Corporation, a corporation of New York No Drawing. Application June 14, 1954
Serial No. 436,696

4 Claims. (Cl. 260—28.5)

This invention is concerned with the incorporation of waxes in polystyrene molding compositions and particularly those compositions adapted for the molding of phonograph records.

In copending application, Serial No. 82,908, filed March 22, 1949, since issued as Patent No. 2,681,323, it has been disclosed that records of good sound quality and wear resistance are obtained when the amount of wax incorporated in a suitable polystyrene exceeds the amount that can be retained in solid solution by the polystyrene and that the amount of wax incorporated should be such that the resulting mixture yields a stable dispersion of the wax throughout the polystyrene mass, which can be molded without the wax migrating or sweating out to the mold surface.

To obtain stable dispersions of wax and polystyrene according to copending application Serial No. 82,908 it is necessary to intensively mix the wax and polystyrene at temperatures from 160° C. and up to 225° C. and higher. Moreover, despite these high temperatures, it took as long as an hour and even more with equipment such as mixing rolls to obtain a stable dispersion of wax and polystyrene.

The present application is a continuation-in-part of our copending application Serial No. 316,072, filed October 21, 1952, now Patent No. 2,779,744, in which there is disclosed wax modified polystyrene compositions prepared by mixing together an aqueous wax emulsion and an aqueous polystyrene emulsion.

According to the present invention, wax modified polystyrene compositions capable of being molded without wax sweatout are prepared by mixing together suitable proportions of an aqueous wax emulsion and of an aqueous polystyrene emulsion, coagulating the mixture to form a dehydrated composite wax-polystyrene coagulum, and then subjecting the coagulum to mechanical working or mixing at temperatures from about 160° C. to 225° C. or higher if desired. The mechanically worked coagulum can then be comminuted, or diced for convenient use as molding material, and upon being either injection or compression molded, yields phonograph records free from wax sweatout and of good sound quality and wear resistance.

Coagulation of the mixed wax and polystyrene emulsion can be effected by the addition of conventional precipitation agents for polystyrene emulsions such as aqueous sodium chloride-hydrochloric acid solution, isopropanol water solution or acetic acid-water solution. The coagulum thus obtained is dehydrated as by exposure to air, or more rapidly by being moderately heated in ovens or on drum dryers at temperatures up to about 150° C.

The mixture of wax emulsion and polystyrene emulsion can also be coagulated by heating the mixture as on drum driers and concurrently dehydrated thereon.

Surprisingly, the mechanical working or mixing of the dried composite wax-polystyrene coagulum at 160° C. or higher temperatures to form compositions characterized by freedom from wax sweatout when molded can be carried out in a fraction of the time and advantageously with simpler mixing equipment than is required to form by mixing a comparable moldable composition from wax and polystyrene in bulk or granular form (e. g. 10 to 100 mesh).

For example, with heated mixers of the screw extrusion type which as a class do not perform as an intensive mixing function as a Banbury type mixer, a single passage through such extruder of a composite dehydrated wax-polystyrene coagulum is ordinarily adequate to obtain a moldable wax-polystyrene dispersion free from wax sweatout when molded. On the other hand, a mechanical mixture of commercial granulated polystyrene and comminuted wax does not form a homogeneous stable dispersion even after repeated passages through a screw extruder, since under the influence of heat, the wax quickly melts, separates out, and thereby coats the extruder screw surfaces with a lubricating film that prevents effective shear development necessary for good mixing.

On heated two or multi-parallel roll mixing equipment, it usually requires from one to two hours of mixing to obtain from a mixture of granular polystyrene and comminuted wax, a satisfactory moldable wax-polystyrene dispersion. In contrast, from 2 to 8 minutes mixing time on heated rolls is usually adequate for producing a satisfactory wax-polystyrene dispersion, from a dehydrated wax-polystyrene coagulum.

While the intensive mixing action of a Banbury can effect a satisfactory dispersion of wax and granulated polystyrene in about fifteen minutes, this time can be reduced in half when processing dehydrated wax-polystyrene coagulums.

Although it is not known with certainty, nevertheless it is believed that in a dried coagulum of wax and polystyrene the wax particles are relatively strongly physically attached to polystyrene particles, and that accordingly upon heating such coagulums to mixing temperatures of about 160° C. and higher, the wax particles do not readily flux together, at least not in an amount tending to form a continuous liquid wax phase which would tend to delay formation of a satisfactory dispersion of wax in the polystyrene.

Moreover, it has been found possible to prepare dried composite coagulums of wax and polystyrene containing more wax than is ordinarily desired in the final composition for molding phonograph records and to readily mix such high wax-containing composite coagulant with additional wax-free polystyrene as well as conventional mineral fillers at mixing temperatures from about 160° C. to 225° C. and higher to form satisfactory wax-polystyrene dispersions containing the desired amount of wax, e. g. from 2 to 10 percent by weight of the total polystyrene content as is described in copending applications Serial No. 82,908 and Serial No. 316,072.

For mixing with wax-free polystyrene, it is possible to use composite dehydrated wax-polystyrene coagulums containing up to about 25% by weight of wax, and still obtain quicker and better compounding of wax-polystyrene molding compositions suitable for phonograph record manufacture, than would be the case by directly mixing the same ultimate proportions of wax and granulated polystyrene.

The polystyrene emulsions may be prepared by known methods of emulsion polymerizing styrene which are controlled so as to yield a polystyrene having average relative molecular weights by the Staudinger method of from 40,000 to about 150,000 and preferably from about 50,000 to 80,000 for optimum moldability and record performance.

The molecular weight is determined by dilute solution viscosity methods according to the following formula:

$$\text{Relative viscosity} = \frac{\text{Time for solution to discharge from pipette}}{\text{Time for solvent to discharge from pipette}}$$

using a solution containing 0.1000 gram of polymer per 100 milliliters of benzene free from thiophene, measurements being made at 20° C.

Specific viscosity = relative viscosity − 1

$$\text{Molecular weight} = \frac{(57,800)(\text{specific viscosity})}{C}$$

C = 0.1000 gm. per 100 ml.

According to this method, polystyrenes having a specific viscosity of 0.865 have a calculated average molecular weight of 50,000 and correspondingly polystyrenes having a specific viscosity of 1.38 have a calculated average molecular weight of 80,000.

The aqueous wax emulsions can be prepared according to methods well known to the art.

The following examples illustrate a typical preparation of a polystyrene emulsion, all parts being by weight in it and subsequent examples.

*Example 1*

Fifty parts of styrene monomer, 75 parts filtered water, 1.5 parts emulsifier such as "Dresinate 731" which is the sodium soap of dehydrogenated rosin, .02 part of a polymer modifier such as a tertiary dodecyl mercaptan and .01 part sodium hydroxide are charged to a mixing tank under an atmosphere of nitrogen, heated to 40° C.–50° C. and thoroughly emulsified by high speed agitation. One-tenth part of a catalyst such as potassium persulfate is then added and the mixture heated to 80° C.–85° C. and maintained at this temperature until polymerization is complete. This is determined by sampling the reaction mixture and determining the solids content. The average particle size of the polystyrene was 0.25 micron, being substantially free of particles larger than 0.5 micron.

To prepare a wax emulsion the following typical procedure may be employed.

*Example 2*

Six parts of microcrystalline wax, 1.00 part zinc stearate, 0.35 part polyethylene glycol oleyl ether ("Antarox–D100" sold by General Aniline & Film Corp.) and 29.40 parts filtered water are charged to a jacketed kettle, heated to 98° C.–99° C. and stirred thoroughly until emulsified. The wax particle size ranged from 0.005 to 0.12 micron.

To prepare the polystyrene-wax coagulum the following typical procedure may be employed.

*Example 3*

Three and five-tenths parts of the emulsion prepared in Example 1 are mixed with 0.5 part of the emulsion from Example 2 and the resulting mixture fed to drum drier where it is dried at a temperature of about 135° C.–145° C. The dried coagulum is removed from the drum in sheet form, ground and then fed to a twin screw extruder heated to a temperature of about 160° C. It is extruded in the form of a sheet and diced. The resulting diced product had a composition of about six parts wax for every 100 parts polystyrene. The diced product formed satisfactory records free from wax sweatout when injection molded.

For some purposes it is desirable to introduce as much wax as possible in the emulsion stage and in that manner prepare a dehydrated wax-polystyrene coagulum having a high wax content. Such a coagulum constitutes a master batch which can be reduced in wax content by compounding a portion of it with the requisite amount of polystyrene to yield a product containing the desired amount of wax for molding phonograph records.

This procedure facilitates the production of a master batch polystyrene-wax formulation which can then be readily and quickly blended with further quantities of polystyrene, fillers, coloring agents and the like in simple mixing equipment such as heated extruders and the like.

*Example 4*

Three and five-tenths parts of the polystyrene emulsion prepared in Example 1 are mixed with one part of the wax emulsion of Example 2 and the resulting mixture fed to a drum drier where it was dehydrated at a temperature of about 135° C.–145° C. The dried coagulum was removed from the drum as a friable sheet which was ground or diced to molding particle size, e. g. 10–100 mesh. The ground material contained twelve parts of wax for every 100 parts polystyrene. Then 100 parts of this material were dry blended as by tumbling with 100 parts wax-free polystyrene granulated to molding material size particles and of about 55,000 average molecular weight, 2 parts carbon black, and 0.01 part of 0.1 to 10 micron size particles of silicon carbide, the sharp edges of these particles having been previously dulled by milling as described in our copending application Serial No. 316,072, filed October 21, 1952. The dry blend was then passed through a heated twin-screw extruder to effect by fluxing and mixing an intimate dispersion of all the components, the composition as extruded having a temperature between 170° C. and 190° C. The extruded material was ground to molding material fineness and then molded by means of heat and pressure in phonograph records of good playing quality and free from wax sweatout.

The waxes used in the composition can be the natural waxes, particularly the ester type waxes, for example carnauba, candellila, montan, esparto, ouricury, beeswax, cotton wax, insect or Chinese wax and the like. Another class of ester type waxes are Japan wax, myrtle wax and the synthetic waxes obtained by substantial hydrogenation of vegetable, marine and animal oils. Another class of natural waxes are the mineral waxes such as paraffin waxes, microcrystalline waxes, ozokerite and ceresin.

The maximum amount of wax which can be incorporated with polystyrene to comprise a master batch is about 25 parts to each 100 parts of polystyrene. Compositions containing wax in excess of this amount become increasingly difficult to compound although it is possible as by special techniques such as slowly adding increments of the polystyrene-wax coagulum to fluxed polystyrene to form satisfactory dispersions.

Fillers may be added to the dehydrated wax-polystyrene coagulum for reducing the cost and to prevent warpage of records on storage at elevated temperatures. The preferred fillers are diatomaceous silica, slate flour and calcium carbonate.

Coloring matter such as carbon black and pigment can be added to the wax-polystyrene coagulums. The addition of metal soaps such as zinc stearate, cadmium stearate and the like are effective in imparting resistance to needle wear.

Phonograph records of consistently good properties may be prepared by preforming the mechanically worked wax-polystyrene coagulums into preforms of the required weight, heating the preform on a table or in an oven to about 140° C., charging the heated preform into the mold or stamper when it is at a temperature of about 125° C., compressing the preform in the mold at a pressure between 2000 and 4000 pounds per square inch while raising the mold temperature to between 130° C. and 150° C. and then cooling the mold and its contents to about 60° C. to 80° C. before opening the press. Heated preforms for compression molding can also be formed by heat-plasticizing the wax-polystyrene coagulum in a heat injection type cylinder, ejecting a measured amount of the hot material into a transfer cup for delivery to a compression molding press. In such operation the plastic is discharged in the cup usually between 170° C. and 200° C. material temperature.

The dehydrated wax-polystyrene coagulums after compounding at 160° C. or higher are especially adapted, however, to injection molding. In this case, dried granules of the composition are fed to the hopper of an injection machine from which they pass to a heating chamber torpedo where they are heated to a temperature of about 200° C. and the plastic mass is then injected into a cooled mold at a pressure of 10,000 pounds to 20,000 pounds.

This application is a continuation-in-part of our co-pending application Serial No. 316,072, filed October 21, 1952, and entitled "Sound Record."

What is claimed is:

1. Process for preparing wax-containing polystyrene compositions which comprises mixing together an aqueous wax emulsion and an aqueous polystyrene emulsion in proportions corresponding to between 2 and 10 parts wax per 100 parts polystyrene coagulating the mixture, dehydrating the mixed coagulum of wax and polystyrene, and then mechanically working the dehydrated coagulum at elevated temperature to form a wax-polystyrene dispersion characterized by freedom from wax-sweatout when molded under heat and pressure.

2. Process for preparing wax-containing polystyrene compositions suitable for molding of phonograph records which comprises mixing together an aqueous wax emulsion and an aqueous polystyrene emulsion in proportions not exceeding about 25 parts wax per 100 parts polystyrene, coagulating the mixture, dehydrating the mixed coagulum, and then mechanically working the dehydrated coagulum at an elevated temperature and mixing the worked dehydrated coagulum with additional polystyrene at a temperature of at least about 160° C. to form a polystyrene composition containing between 2 and 10 parts wax per 100 parts polystyrene and characterized by absence of wax-sweatout when molded under heat and pressure.

3. Process for preparing a wax-containing polystyrene composition suitable for molding phonograph records which comprises mixing together an aqueous natural wax emulsion and an aqueous emulsion of polystyrene having an average molecular weight between 50,000 and 80,000 as determined by viscosity measurements; coagulating the mixture, dehydrating the mixed coagulum of wax and polystyrene, and then mechanically working the dehydrated coagulum at temperatures of at least about 160° C. to form a wax-polystyrene dispersion characterized by absence of wax-sweatout when molded under heat and pressure.

4. Process for preparing wax-containing polystyrene compositions suitable for molding of phonograph records which comprises mixing together an aqueous wax emulsion and an aqueous polystyrene emulsion in proportions not exceeding about 25 parts wax per 100 parts polystyrene, coagulating the mixture, dehydrating the mixed coagulum, and then mechanically working the dehydrated coagulum at an elevated temperature while mixing the dehydrated coagulum with additional polystyrene at a temperature of at least about 160° C. to form a polystyrene composition containing between 2 and 10 parts wax per 100 parts polystyrene and characterized by absence of wax-sweatout when molded under heat and pressure.

References Cited in the file of this patent

UNITED STATES PATENTS

| | | |
|---|---|---|
| 2,127,381 | Herrmann et al. | Aug. 16, 1938 |
| 2,540,996 | Ryden | Feb. 6, 1951 |
| 2,614,093 | Wheelock | Oct. 14, 1952 |
| 2,681,323 | Groff et al. | June 15, 1954 |
| 2,695,277 | Pabst et al. | Nov. 23, 1954 |